United States Patent
Calhoun et al.

(10) Patent No.: US 10,353,744 B2
(45) Date of Patent: Jul. 16, 2019

(54) SYSTEM WIDE MANAGEABILITY

(71) Applicant: Hewlett Packard Enterprise Development LP, Houston, TX (US)

(72) Inventors: Michael Bozich Calhoun, Roseville, CA (US); Alexander V Jizrawi, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 457 days.

(21) Appl. No.: 15/101,367

(22) PCT Filed: Dec. 2, 2013

(86) PCT No.: PCT/US2013/072600
§ 371 (c)(1),
(2) Date: Jun. 2, 2016

(87) PCT Pub. No.: WO2015/084300
PCT Pub. Date: Jun. 11, 2015

(65) Prior Publication Data
US 2016/0299792 A1    Oct. 13, 2016

(51) Int. Cl.
*G06F 9/46* (2006.01)
*G06F 9/50* (2006.01)
*G06F 11/00* (2006.01)

(52) U.S. Cl.
CPC ............ *G06F 9/5072* (2013.01); *G06F 11/00* (2013.01)

(58) Field of Classification Search
CPC .................................................. G06F 9/5072
See application file for complete search history.

(56) References Cited

U.S. PATENT DOCUMENTS

| 6,012,152 A * | 1/2000 | Douik .................. G06F 11/0709 |
| | | 714/26 |
| 8,185,913 B1 | 5/2012 | Talwar et al. |
| 2003/0018927 A1 | 1/2003 | Gadir et al. |
| 2005/0015430 A1 | 1/2005 | Rothman et al. |
| 2006/0095702 A1 | 5/2006 | Hickman |
| 2007/0101167 A1 | 5/2007 | Lindley |

(Continued)

FOREIGN PATENT DOCUMENTS

| EP | 2018614 | 1/2009 |
| TW | 201232414 | 8/2012 |

(Continued)

OTHER PUBLICATIONS

Hewlett Packard Co.; Efficiently Managing Virtual Connect Environments ; http://h20000.www2.hp.com/bc/docs/support/SupportManual/c03028646/c03028646.pdf>; Sep. 2011.

(Continued)

*Primary Examiner* — James J Lee
(74) *Attorney, Agent, or Firm* — Brooks, Cameron & Huebsch, PLLC (57) ABSTRACT

Techniques for providing a system wide manageability interface are provided. In one aspect, manageability data may be received from a plurality of manageability subsystems. Each manageability subsystem may be contained in a domain. The received manageability data may be coalesced into a system wide view. The system wide view may span all domains.

13 Claims, 6 Drawing Sheets

(56) References Cited

U.S. PATENT DOCUMENTS

| | | |
|---|---|---|
| 2009/0216910 A1 | 8/2009 | Duchesneau |
| 2010/0333089 A1* | 12/2010 | Talwar ................. G06F 11/004 |
| | | 718/1 |
| 2011/0295944 A1 | 12/2011 | Buonomo |
| 2012/0192186 A1* | 7/2012 | Bornstein ............. G06F 9/5011 |
| | | 718/100 |
| 2013/0080804 A1 | 3/2013 | Ananthakrishan et al. |
| 2014/0033222 A1* | 1/2014 | Jeyapaul ............. G06F 11/1479 |
| | | 718/105 |

FOREIGN PATENT DOCUMENTS

| | | |
|---|---|---|
| TW | 201327207 | 7/2013 |
| WO | WO-2012109401 | 8/2012 |

OTHER PUBLICATIONS

ISA/KR, International Search Report dated Aug. 1, 2014; PCT/US2013/072600 filed Dec. 2, 2013.

\* cited by examiner

SYSTEM WIDE MANAGEABILITY

BACKGROUND

Modern server computer systems may take many forms. A simple server may include a single processor, with a single core, on a single motherboard, in a single enclosure. A more complex system may include multiple processors and/or cores on a single motherboard. Even more complex systems may include multiple motherboards, containing varying numbers of processors and cores, each within their own enclosure. The enclosures may be coupled together via external cabling. In yet other complex systems, often referred to as blade systems, the motherboards (blades) with associated processors/cores are contained within a blade enclosure. The enclosure itself may provide connectivity paths between the blades, removing the need for additional cabling between the blades. Supporting functions, such as power and cooling, may be shared between the blades.

DETAILED DESCRIPTION

The availability of server systems in many different forms is useful to an end user. The end user may be able to select a system that best meets the needs of the workloads that are being run on the system. Unfortunately, what is beneficial for the end user may create problems for server system vendors.

System firmware allows the various components of a server system to communicate with each other and form a complete system. In a blade computer system, for example, the system firmware may allow multiple blades to be aggregated together, such that they operate as a single server system. There are several possible ways a server vendor may provide firmware with such capabilities. Each of these ways may have its own problems.

For example, a server system vendor may create entirely custom firmware for each possible configuration of server system. As should be clear, custom firmware for each possible system would result in an increase in costs for the vendor, resulting in increased costs for the end user. In addition, custom system firmware for each possible configuration would be very difficult for a vendor to maintain. Another example solution may involve designing the system firmware to accommodate the largest possible system that may ever be deployed. As should be clear, this would result in the firmware being overly complex for smaller systems, because the single firmware would have to support both large and small systems.

Another possible solution is to provide firmware on each individual component (e.g. each blade) that is capable of communicating with each other component to form a self discovering system firmware. For example this solution may involve the various components operating in a master/slave relationship, wherein one component is the master and is responsible for configuration of the overall system. Again, such a solution increases complexity of the system firmware, as each component may need to be able to act as master or slave at any given time. Furthermore, fault handling becomes overly complex, as any recovery action is dependent on if component is acting as a master or slave.

Techniques described herein overcome the problems described above and others by providing a Virtualized Manageability Data Interface (VMDI) in system firmware. Modern servers include manageability subsystems, which are often referred to as baseboard management controllers (BMC). A BMC may be coupled to all manageable elements, such as processors and sensors, within a domain. The BMC, which can also be referred to as the manageability subsystem, may be coupled to the system firmware through the VMDI.

Upon system startup, the manageability subsystem of each node may send manageability data, which may also be referred to as manageability information, to the VMDI. Manageability data may include information such as the number and types of processors installed in the domain, sensor readings, installed memory, or any other information about the domain. It should be understood that each manageability subsystem only reports manageability information about its own domain.

The system firmware may then take the manageability data received through the VMDI from all of the domains and coalesce that information into a single, system wide view. This information may then be used by the system firmware to configure the system as a whole. For example, the system may include three domains, each with two processors. Each domain may report, through the VMDI, that there are two processors in the domain. The system firmware may aggregate this information to indicate that the overall system has six processors.

In addition, the system firmware may then translate system wide configuration commands into domain specific configuration commands, which may also be referred to as management commands. Continuing with the processor example, the system firmware may need to assign processor numbers to each of the six processors. The system firmware may assign processor numbers one and two to the first domain, three and four to the second domain, and five and six to the third domain. These commands could be sent to the respective domains. However, there is no need for each domain to have any information about the other domains. Each domain is able to operate as if it were operating in isolation. As should be clear, this reduces the complexity of the management subsystem for each domain, because each domain need only be concerned with itself. The remainder of the overall system is hidden from the individual domains.

Finally, there may be some domain specific events that may need system wide information to be properly processed. For example, if all domains are sharing a limited power source, and one domain requests additional power, the system firmware may arbitrate this request. The system firmware may first determine how much power is being used by all domains combined. When sufficient power is available, the system firmware may grant the request. The requesting domain need not have any knowledge that other domains are also sharing the power source. Likewise, in some cases a single domain may cause an event that would affect the system as a whole. For example, a processor failure in a single domain may need to shut the entire system down. The system firmware may receive such events and determine if system wide action is needed.

Because each domain essentially operates in isolation for purposes of configuration and fault handling, server systems can be created with an arbitrary number of domains. If an end user's workload necessitates a smaller, single domain system, such a need can be satisfied. If an end user needs a larger, multi domain system, the need can be satisfied by combining multiple domains. Because the multi domain nature of the larger system is hidden by the system firmware, there is no need for specialized development within each of the domains. In other words, as system size needs to increase, additional domains are added in a modular fashion.

Figure 1:
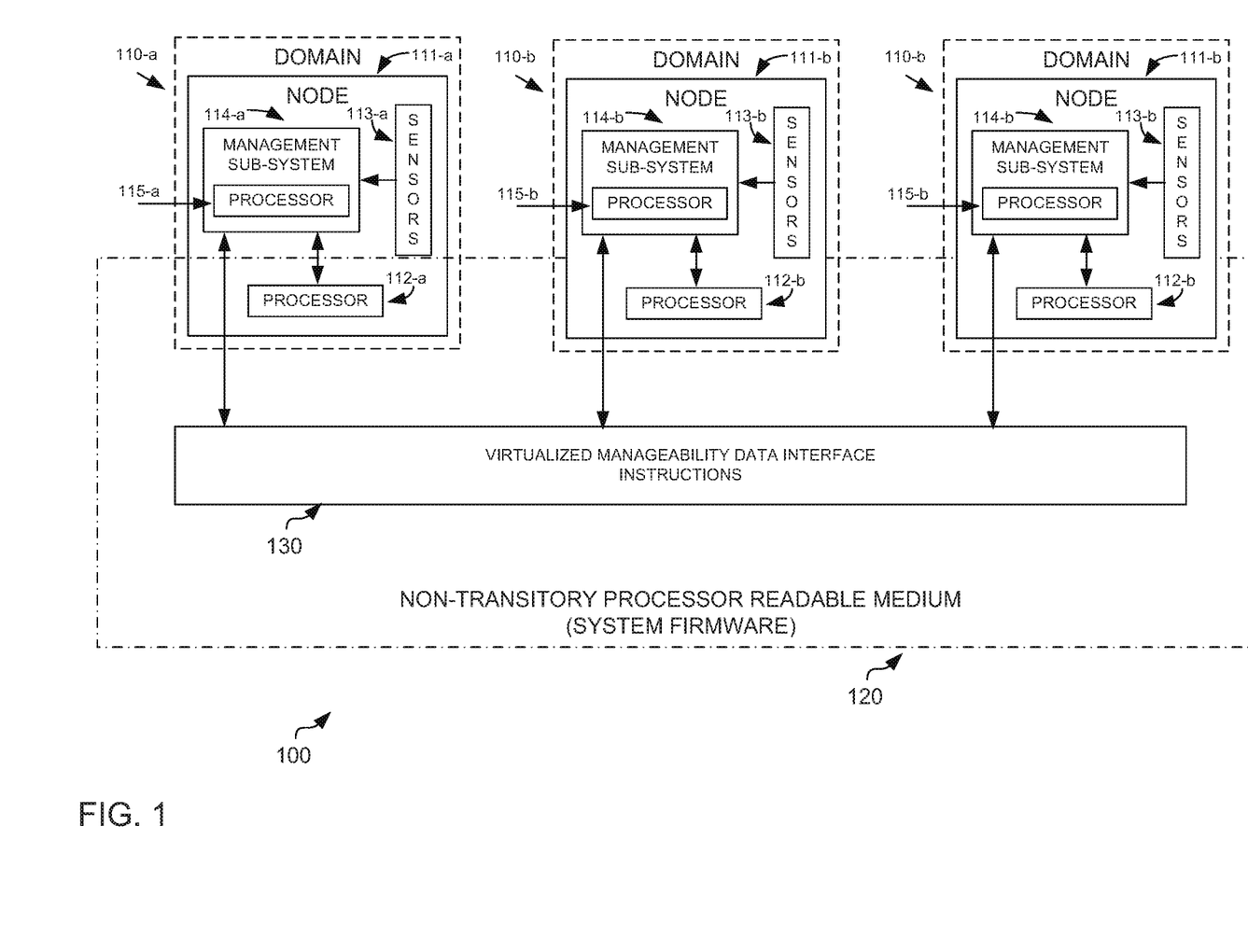
FIG. 1 is an example of a system that may utilize a virtualized manageability data interface described herein.

FIG. 1 is an example of a system 100 that may utilize a virtualized manageability data interface described herein. The system may include a plurality of domains 110-a-c. Although only three domains are shown, it should be understood that the system may have any number of domains. The system may also include a non-transitory processor readable medium 120. The medium, may contain thereon instructions which form the system firmware. For example, the instructions may include instructions to implement a VMDI 130.

For purposes of simplicity of explanation, domain 110-a will be described. However, it should be understood that all domains may have a similar structure. Domain 110-a may include a node 111-a. A node, for example, may be a modular component that may be combined with other nodes to form larger systems. For example, a node may be an individual blade in a blade computing system. A node may be a standalone server contained in an enclosure that may be coupled to other nodes to form larger systems. Regardless of the specific form factor, what should be understood is that nodes may be the building blocks through which larger systems are created.

Each node may include one or more processors 112-a. The specific number of processors per node is relatively unimportant. Likewise, each processor may have one or more cores (not shown). Again, the specific number of cores per processor is relatively unimportant. The processor 112-a may be responsible for executing the workloads assigned to the node. The node may also include sensors 113-a. These sensors may measure the environmental conditions of the node. For example, there may be sensors that measure the temperature of the processor, of the incoming cooling air, and the outgoing exhaust air. In addition, there may be sensors that measure the amount of current or voltage being generated and/or drawn by various components in the node. The sensors may be used to detect fault conditions within the node.

The node may also include a management subsystem 114-a. The management subsystem may include a management processor 115-a. The management processor may often be referred to as a baseboard management processor (BMC). The management processor may be coupled to the processor 112-a and sensors 113-a and is able to read and communicate the status of those components to the system firmware, which is described in further detail below. The management processor may also be coupled to a management firmware (not shown). The management firmware may provide the instructions necessary to allow the management subsystem 114-a to communicate with the system firmware 120.

It should be noted that in some cases, the management subsystem 114-a and its associated firmware may not be provided by the vendor of the node. For example, the node vendor may simply purchase the management subsystem as an off-the-shelf component to be integrated into the node. This is very similar to how many different node vendors all utilize off-the-shelf processors provided by processor companies such as Intel™. As such, the solution describe herein is operable without requiring customization of the management subsystem firmware, as such customization may not even be possible given that the node vendor may be using an off-the-shelf management subsystem.

As shown in FIG. 1, there appears to be a one to one correspondence between a domain and a node. However, this depiction is for purposes of simplicity of explanation, not by way of limitation. A domain is intended to include all components that are managed by a single management subsystem. A node is intended to include all resources that may be available to allow the system to operate on workloads. Thus, it is possible that multiple nodes may be contained in the same domain, with only one node including a management subsystem. Although in many cases there will be a one to one relationship between domains and nodes.

The system firmware 120 may include VMDI instructions 130. The VMDI instructions may be executed by the processors 112-a-c in the domains 110-a-c as part of the system firmware. System firmware are the instructions that allow the processors from the various domains to communicate with each other and to behave as a single system. System firmware may be defined as software that is tightly coupled to the system and runs on the same hardware that is used by the system to process workloads. In other words, the system firmware operates in the same address space as the operating system and applications running on the system. The VMDI instructions provide an interface for each of the management subsystems of the domains to communicate domain specific information to the system firmware. The system firmware may coalesce this information into a system wide view by aggregating the management information from each of the domains. The system firmware may then make system wide configuration decisions. Finally, the system firmware may translate the system wide configuration into domain specific management commands. Thus, each domain need not be aware of the system wide configuration, but rather only needs to respond to commands sent to that domain alone In operation, at system startup, each domain 110, through its respective management subsystem 114, may send manageability information to the system firmware through the VMDI 130. Each domain may be unaware that it is communicating with a system firmware that is also communicating with other domains. Thus, each domain has no knowledge of the other domains. The system firmware may then proceed to make system wide configuration decisions. These system wide configuration decisions may include any of the types of configuration that are needed for a large system. Specific parameters are described in further detail below.

Once the system firmware has made configuration decisions, these decisions may be segmented and translated into management commands, also referred to as events, that are specific to a particular node. These types of commands are referred to as node local commands or events, because they are only applicable to the node that is receiving the command. In other words, system wide configuration is broken down into the configuration needed by each node individually, without requiring each node to have complete knowledge of the overall larger system. Upon receipt of the node local commands, each node may configure itself accordingly. After each node has configured itself according to the node local commands, the entire system is then configured as one larger system.

During operation of the system, an individual node may need to request a resource that is shared between all of the nodes. In such cases, the node may send a request to the system firmware through the VMDI. The node itself is only aware that it is sending the resource request to the system firmware, as the VMDI is completely transparent to the node. The system firmware then determines if the resource request may be granted, based on the resource usage of the system as a whole. If the request is granted, the node may be sent a management command indicating that the resource request was granted.

A node may also request a shared resource setting that may have impacts to the overall system. The system firmware may receive the request through the VMDI and make a determination as to the proper system wide setting. A node may also request use of a resource that may only be used by one node at a time. The system firmware may determine which node should be granted use of the resource. In yet another example, a node may experience a fault that may or may not impact the entire system. The fault indication may be sent to the system firmware. The system firmware may decide if system wide action (such as shutdown) is needed, or if the fault is isolated to a particular node, such that only node local corrective action is needed.

Figure 2:
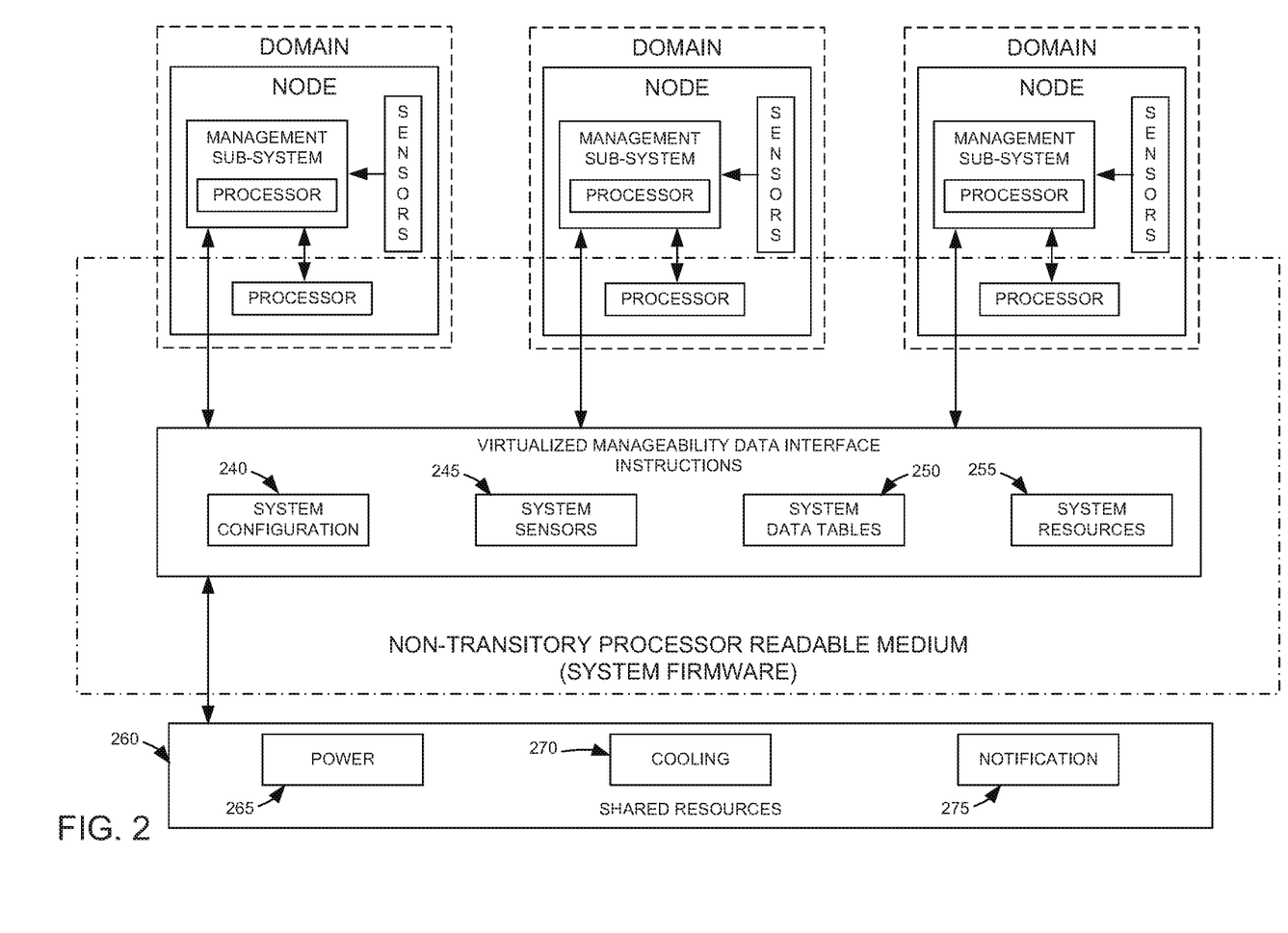
FIG. 2 is another example of a system that may utilize a virtualized manageability data interface described herein.

FIG. 2 is another example of a system that may utilize a virtualized manageability data interface described herein. FIG. 2 generally contains the same elements as FIG. 1, and for simplicity of explanation, the description of those elements is not repeated. FIG. 2 describes additional elements of the VMDI. For example, the VMDI may include system configuration tables 240, system sensor tables 245, system data tables 250, and system resource tables 255. In addition, FIG. 2 depicts certain components and resources that may be shared 260 by all nodes within the system. For example, FIG. 2 depicts power resources 265, cooling resources 270, and notification resources 275. Although specific examples, are presented, it should be understood that these examples are for purposes of explanation, and not limitation.

System configuration 240 may include information about the current system configuration and status. For example, the system configuration can include information about which resources have been assigned to which domains or which resources are out of service. When node management information is received from a node, the system configuration may be examined to determine the appropriate action to take. For example, if a node is requesting additional power 265, the system configuration may be reviewed to determine how much power remains to be allocated. Depending on this result, the request for additional power may or may not be granted.

The system firmware may also include system sensor tables 245. The system sensor tables may store the current status of all the sensors in each of the domains. The system firmware may then make decisions based on the data contained in the system sensor table. For example, in one implementation, if all the processors in a single domain are reporting a high temperature, but none of the processors in any other domain are reporting a high temperature, the system firmware may determine there is a problem with only the node reporting high temperature. As such, corrective action may be taken on that node only. The system firmware may generate node local commands to shut down the offending node. However, if all nodes are reporting out of range temperature, the problem may be system wide. The system firmware may then generate node local commands for all nodes, instructing the nodes to shut down, which essentially shuts down the entire system. In other implementations, the system firmware may treat the entire system as a whole, and an error condition from any node may result in system wide corrective action. Thus, depending on the particular implementation and error conditions, the system firmware may take node specific or system wide corrective action.

The system firmware may also include system data tables 250. The system data tables may include information that may be consumed by the system firmware when configuring the system. As mentioned above, each domain may send node local management information to the system firmware through the VMDI. For example, each node may send information related to the hardware configured on the node. One example may be the number of processors configured on the node. The system firmware may then coalesce all of the information received from the various nodes into the system data tables. These tables may reflect all of the hardware in the system, regardless of which node the hardware resides on. The table data may then be consumed by configuration routines within the system firmware or the operating system to configure the system as a whole.

The system firmware may also include a system resource list 255. The system resource list may include information about resources that are shared by all nodes within the system. For example, cooling resources 270, such as fans, may be shared by all nodes within the system. As another example, notification resources 275 may be shared by all nodes in the system. An example of a notification resource may be a display panel on the front of an enclosure, such as a blade enclosure. The display panel may only be usable by a single node at a time.

The system firmware may make use of the system resource table 255 when determining how to configure system wide resources. For example, an individual node may be experiencing below normal operating temperatures, and may request that the speed of the system cooling fans be decreased. However, the node itself is not aware that the overall system contains other nodes, all of which may not be experiencing the same operating temperature conditions. The system resource list may be used to determine the proper settings for resources that are shared between all of the nodes.

As another example, the system may include a notification resources 275, such as a display panel on the front of an enclosure. If multiple nodes have information that is to be displayed on the notification panel, the system firmware may need to make a decision as to which node is to be granted use of the notification panel. The system resource list may include information about which resources have been granted to which nodes. The system resource list may be used when determining how shared resources are to be granted to nodes.

Figure 3:
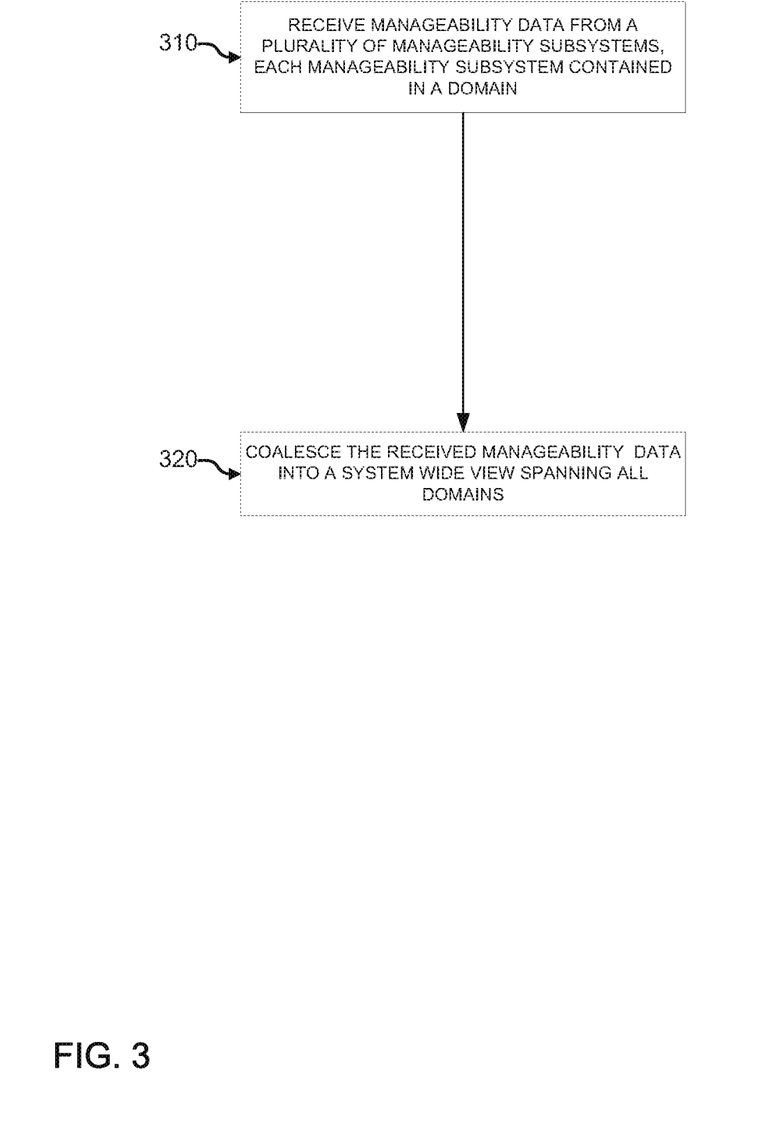
FIG. 3 is an example of a high level flow diagram for receiving and coalescing manageability data according to the techniques described herein.

FIG. 3 is an example of a high level flow diagram for receiving and coalescing manageability data according to the techniques described herein. In block 310, manageability data may be received from a plurality of manageability subsystems. Each of the manageability subsystems may be contained in a domain. As described above, a domain may include all of the hardware resources that are managed by a single manageability subsystem.

In block 320, the received manageability data may be coalesced into a system wide view spanning all domains. As described above, multiple independent domains may be aggregated to form a larger system. Each individual domain may maintain its independent nature. However, the virtualized manageability data interface provides a mechanism for system firmware to receive manageability data from each of the domains and combine that data into a larger system wide view.

Figure 4:
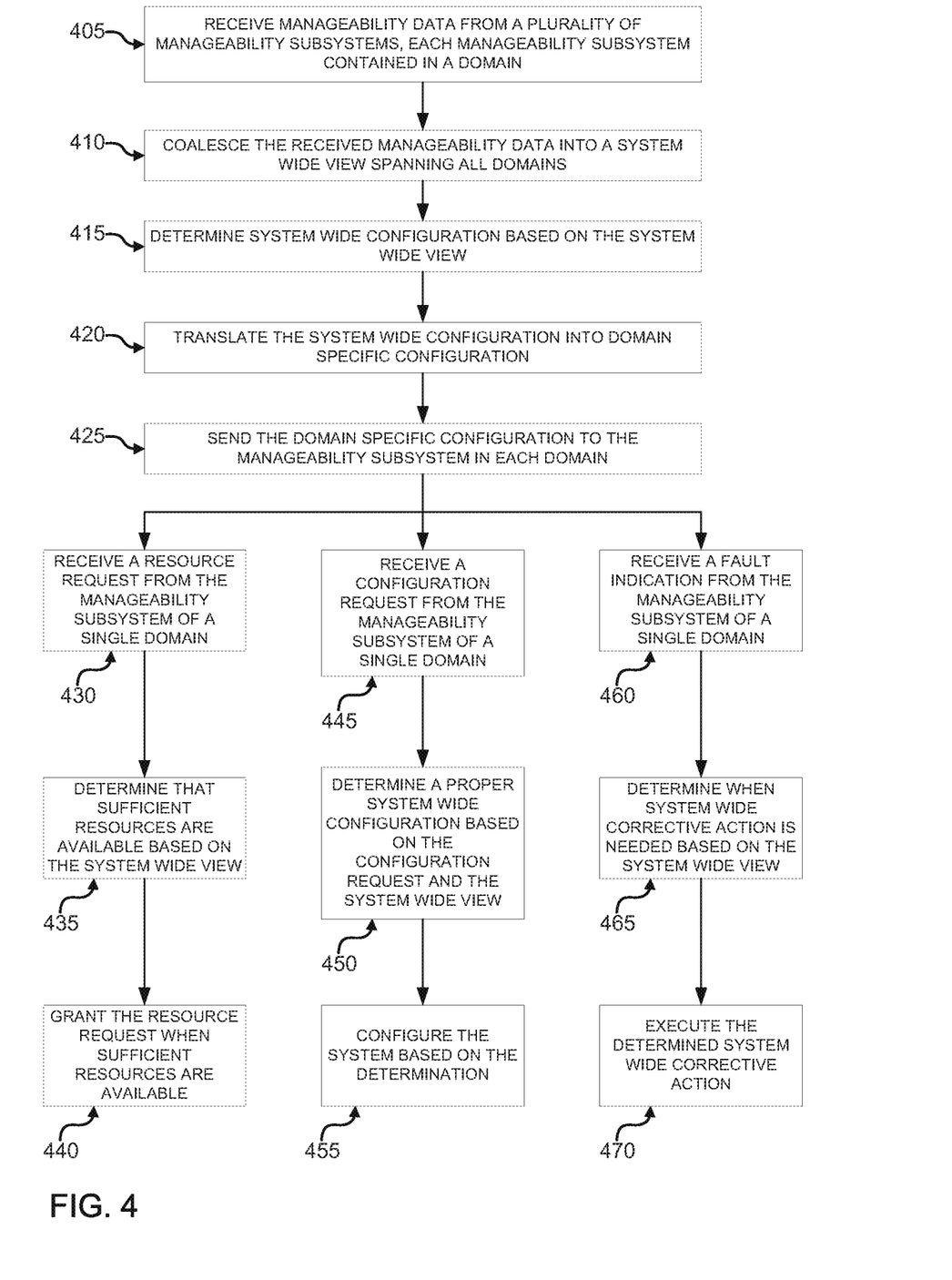
FIG. 4 is another example of a high level flow diagram for receiving and coalescing manageability data, as well as operating on the manageability data, according to the techniques described herein.

FIG. 4 is another example of a high level flow diagram for receiving and coalescing manageability data, as well as operating on the manageability data, according to the techniques described herein. In block 405, just as above, manageability data may be received from a plurality of manageability subsystems. Each of the manageability subsystems may be contained in a domain. In block 410 the received manageability data may be coalesced into a system wide view spanning all domains.

In block 415, system wide configuration may be determined based on the system wide view. As explained above, the system firmware is made aware of all of the hardware resources present in each of the domains. The system firmware may then determine how to configure the entire system, as it would be configured if all of the resources of the plurality of domains were all contained in the same domain. In block 420, the configuration may be translated into domain specific configuration. As explained above, each of the domains are independent from each other. Thus, when a particular domain is to be configured, the configuration must be specific to that domain. In block 420, the domain specific configuration may be sent to the manageability subsystem in each domain. The manageability subsystems may then configure the resources of each domain in accordance with the domain specific configurations.

In block 430, a resource request from the manageability subsystem of a single domain may be received. A domain may be requesting a resource for which there is a limited system wide supply. For example, one of the domains may be requesting additional power in order to allow a processor within that domain to operate at a higher speed. There may be a system wide limitation on the amount of power available.

In block 435, it may be determined that sufficient resources are available based on the system wide view. As explained above, the system firmware maintains a system wide view of all available resources. When sufficient resources are available to grant a request from a single domain, the resources may be allocated to that domain. In block 440, the resource request may be granted when sufficient resources are available.

In block 445, a configuration request may be received from the manageability subsystem of a single domain. A configuration request may be different than a resource request, in that a configuration request may be requesting configuration changes that affect the entire system, as opposed to a single domain. For example, a system fan may only spin at one speed at a time. A domain may be experiencing higher than normal operating temperatures and might request a change in configuration to increase the speed of the system fan. However, changing the speed of the system fan affects all domains, not just the requesting domain.

In block 450, the proper system wide configuration may be determined based on the configuration request and the system wide view. The system firmware may evaluate the request from a single domain in view of the system wide configuration to determine the correct system wide configuration. For example, in the case of a system fan, if one domain requests additional cooling, the proper response may be to increase the speed of the fan, even if no other domain requests additional cooling. As another example, a domain may request use of the notification facilities of the system. However, a different domain may already be using the notification facilities. The system firmware may then determine the proper configuration of the notification facilities, given a system wide view. For example, the system firmware may determine which domain's notification information is of higher priority, and may grant the use of the notification facilities to that domain. In block 455, the system may be configured based on the determination. In other words, the system may be configured after taking into account the configuration requests from all domains.

In block 460, the fault indication may be received from the manageability subsystem of a single domain. As explained above, each manageability subsystem is coupled to the hardware resources of the domain. If a fault occurs, the manageability subsystem may send an indication of the fault to the system firmware. In block 465, a determination of when system wide corrective action is needed may be made. The determination may be made based on the system wide view. Some faults that occur within a domain may not have any impact on any other domains. For example, an indication of a corrected memory error would have no impact on the system as a whole. However, a fault such as a processor failure due to overheating, may necessitate shutting down all domains that make up the system. The system firmware may decide the proper corrective action based on the system wide view. In block 470, the determined system wide corrective action may be executed. In some cases, it may be determined that no corrective action is required. In other cases, system shutdown may be needed. The corrective action may lie somewhere in between.

Figure 5:
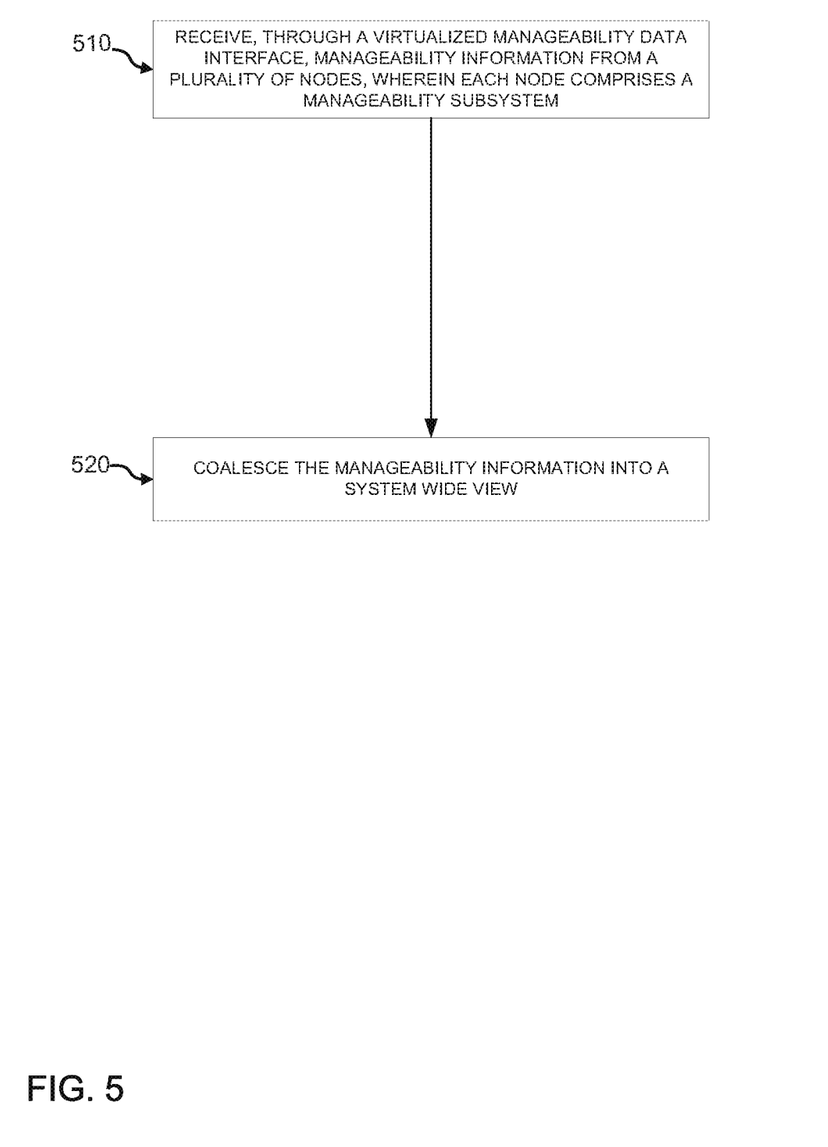
FIG. 5 is an example of a high level flow diagram for receiving and coalescing manageability data according to the techniques described herein.

FIG. 5 is an example of a high level flow diagram for receiving and coalescing manageability data according to the techniques described herein. In block 510, manageability information may be received from a plurality of nodes through a virtualized manageability data interface. Each node may comprise a manageability subsystem. As described above, each node may operate independently of all other nodes and include a manageability subsystem. The manageability subsystem may send manageability information to a system firmware.

In block 520, the manageability information may be coalesced into a system wide view. As explained above, system firmware may provide a virtualized manageability data interface to receive manageability information from all of the nodes. The system firmware may then coalesce the received information into a system wide view that includes the information from all of the nodes that make up the system.

Figure 6:
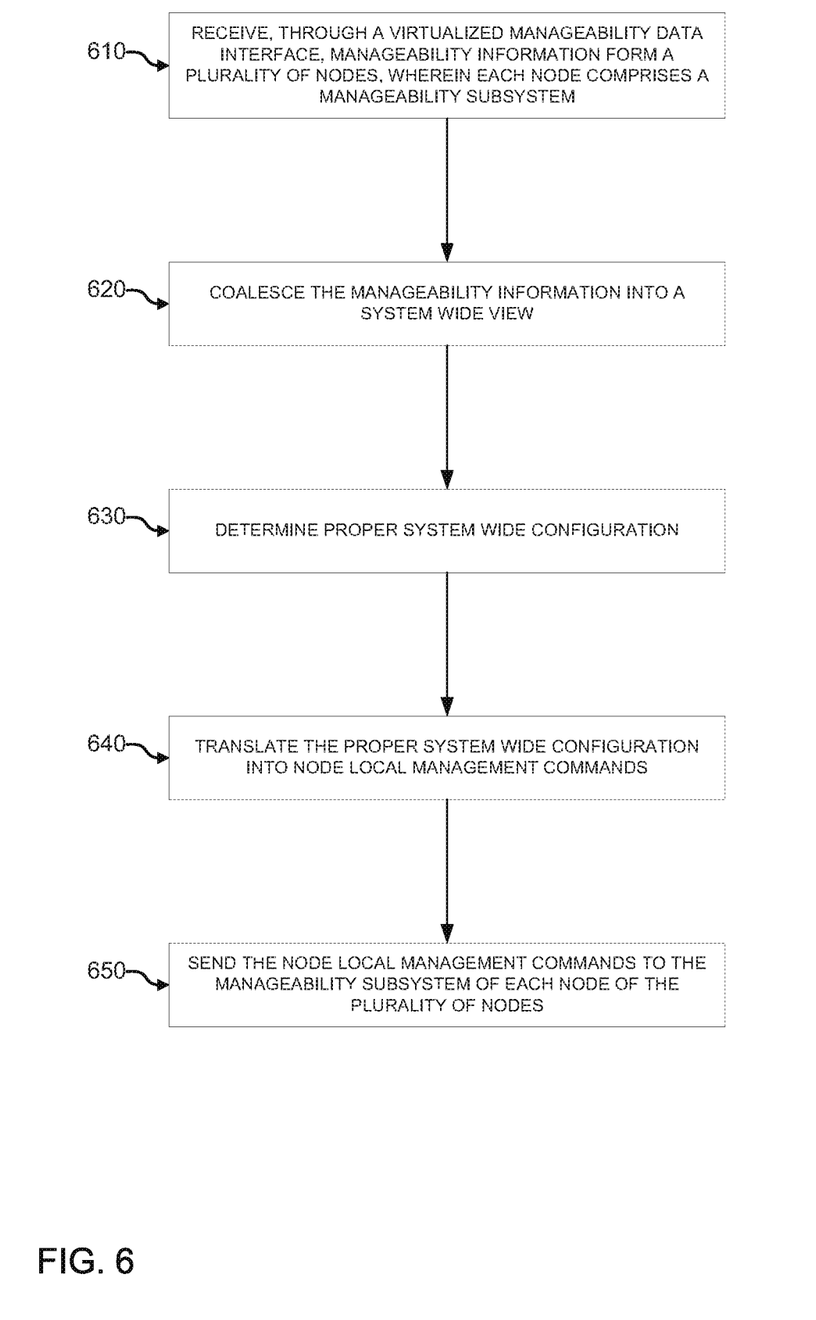
FIG. 6 is another example of a high level flow diagram for receiving, coalescing, and local node configuration, based on manageability data according to the techniques described herein.

FIG. 6 is another example of a high level flow diagram for receiving, coalescing, and local node configuration, based on manageability data according to the techniques described herein. In block 610, just as above, manageability information may be received from a plurality of nodes through a virtualized manageability data interface. Each node may comprise a manageability subsystem. In block 620, the manageability information may be coalesced into a system wide view.

In block 630, the proper system wide configuration may be determined. For example, after the manageability information from the plurality of nodes is received, the system firmware has a system wide view of all of the resources that are being provided by each node. The system firmware may then be able to determine how those resources are to be configured for the system as a whole.

In block 640, the proper system wide configuration may be translated into node local management commands. As explained above, each node may be unaware of the other nodes that, when combined, form the overall system. Thus, when the system has determined the proper configuration overall, those configuration commands may be translated into commands that address each node individually. These are the node local commands. In block 650, the node local management commands may be sent to the manageability subsystem of each node of the plurality of nodes. In other words, each node may receive configurations commands that affect that node only. Once all nodes are configured individually, the resultant combination is a system with operational parameters as determined by the system firmware.

We claim:

1. A system comprising:
   a plurality of nodes, each node comprising a manageability subsystem and a processor, contained in a domain, to perform node management functions; and
   a system firmware comprising instructions executable by a processing resource running on the nodes, the system firmware providing a virtualized manageability data interface coupled to each manageability subsystem of the plurality nodes, to provide system wide management functions, wherein the virtualized manageability data interface of the system firmware includes instructions for each manageability subsystem of the plurality of nodes to communicate domain specific information to the system firmware, wherein the system firmware coalesce the received information to determine a system wide configuration, translates the system wide configuration into domain specific configurations, wherein each manageability subsystem is configured to receive a domain specific command.

2. The system of claim 1 wherein each node of the plurality of nodes further comprises:
   a management firmware to send node local management events to the system firmware, wherein each nodes management events are independent of other nodes.

3. The system of claim 1 wherein each node of the plurality of nodes further comprises:
   a management firmware to receive node local management commands, wherein the node local management commands are generated by the system firmware, the system firmware generating the commands based on the plurality of nodes.

4. The system of claim 1 wherein the system firmware further:
   receives management events from the plurality of nodes through the virtualized manageability data interface; and
   consolidates the events into a system wide view.

5. The system of claim 1 wherein the system firmware further:
   determines system wide management actions;
   segments the system wide management actions into node local commands; and
   sends the node local commands to the plurality of nodes.

6. The system of claim 1 wherein the system firmware further:
   receives node configuration data from each of the plurality of nodes; and
   aggregates the node configuration data into system wide configuration data, wherein an operating system access the system wide configuration data for system management.

7. The system of claim 1 wherein the system firmware further:
   allocates shared system resources based on information received from the management subsystems through the virtualized manageability data interface.

8. The system of claim 1 wherein the system firmware further:
   initiates system wide actions based on a node local fault event.

9. A method comprising:
   receiving, from a plurality of nodes, manageability data, wherein the plurality of nodes comprise manageability subsystem, contained in a domain to perform node management functions;
   communicating the domain specific information, received from the plurality of nodes, to the system firmware;
   coalescing the received manageability data into a system wide view spanning all domains;
   determining system wide configuration based on the system wide view;
   translating the system wide configuration into domain specific configuration; and
   sending the domain specific configuration to the manageability subsystem in each domain.

10. The method of claim 9 further comprising:
    receiving a resource request from the manageability subsystem of a single domain;
    determining that sufficient resources are available based on the system wide view; and
    granting the resource request when sufficient resources are available.

11. The method of claim 9 further comprising:
    receiving a configuration request from the manageability subsystem of a single domain;
    determining a proper system wide configuration based on the configuration request and the system wide view; and
    configuring the system based on the determination.

12. The method of claim 9 further comprising:
    receiving a fault indication from the manageability subsystem of a single domain;
    determining when system wide corrective action is needed based on the system wide view; and
    executing the determined system wide corrective action.

13. A non-transitory processor readable medium containing thereon a set of instructions, which when executed by the processor cause the processor to:
    receive, through a virtualized manageability data interface of a system firmware:
      manageability information from a plurality of nodes, wherein each node comprises a manageability subsystem, contained in a domain, to perform node management functions; and
      instruction for the plurality of nodes to receive a node specific command and for the plurality of nodes to communicate with other nodes of the plurality of nodes for the system firmware to configure a system as a whole; and
    coalesce the manageability information into a system wide view spanning all domains;
    determine system wide configuration based on the system wide view;

translate the system wide configuration into domain specific configuration; and send the domain specific configuration to the manageability subsystem in each domain.

* * * * *